United States Patent Office 3,795,660
Patented Mar. 5, 1974

3,795,660
METHOD OF ISOLATING AROMATIC POLYSULPHONES
Ronald George Feasey, Knebworth, and Alan Branford Newton, Enfield, England, assignors to Imperial Chemical Industries Limited, London, England
No Drawing. Filed Dec. 20, 1971, Ser. No. 210,233
Claims priority, application Great Britain, Jan. 5, 1971, 457/71
Int. Cl. C08g 23/10
U.S. Cl. 260—49
5 Claims

ABSTRACT OF THE DISCLOSURE

A method is provided for improving the isolation of aromatic polysulphones from the reaction mixture in which they are formed comprising adding to the reaction mixture an inert solvent for the aromatic polysulphone, the inert solvent being liquid at the polymerization temperature but solid at the temperature at which the reaction mixture is subsequently processed.

---

This invention relates to aromatic polysulphones and in particular to a method of extracting aromatic polysulphones from their reaction mixture.

Aromatic polysulphones and methods for making them, are described in British patent specifications 1,016,245; 1,060,546; 1,078,234; 1,109,842; 1,122,192; 1,133,561; 1,153,035; 1,153,528; 1,177,183; 1,234,301 and 1,246,035, United States specification 3,432,468, Netherlands specifications 69 03070 and 70 11346 and German specification 1,938,806, the disclosures of which are incorporated herein by reference.

The aromatic polysulphones described in the above-mentioned specifications comprise repeating units of the formula —Ar—SO$_2$— in which Ar is a bivalent aromatic radical and may vary from unit to unit in the polymer chain (so as to form copolymers of various kinds). Thermoplastic polysulphones generally have at least some units of the structure

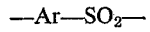

in which Y is oxygen or sulphur or the residue of an aromatic diol such as 4,4'-bisphenol. One example of such a polysulphone has repeating units of the formula

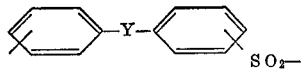

another has repeating units of the formula

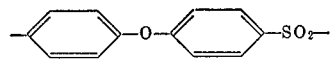

and others (which are commercially available in the United States of America) are said to have repeating units of

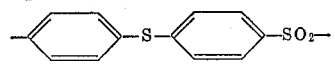

(Union Carbide Corporation) or copolymerized units in various proportions of the formulae

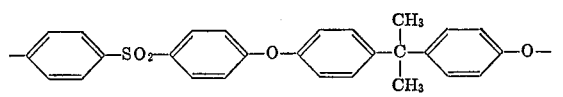

(Minnesota Mining and Manufacturing Company).

Other thermoplastic polysulphones have repeating units of the formula

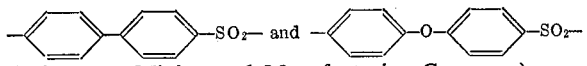

(where Q is oxygen or sulphur) which may be copolymerized with units of other formulae given above.

It is often desirable to carry out the preparation of aromatic polysulphones in the presence of a diluent or solvent for the starting materials and/or the polymer as described, for example, in British specifications 1,060,546; 1,109,842 and 1,122,192 for electrophilic polymerization reactions and in British specifications 1,078,234; 1,153,-035 and 1,177,183 for nucleophilic polymerization reactions.

Polymerization in the absence of a solvent has many disadvantages. For example, as polymerization continues the mixture loses mobility and eventually becomes solid despite progressive increase in temperature, and in order to obtain products of high molecular weight it may be necessary to stop the reaction, grind the solid product into powder form and then continue the polymerization in the solid phase. Such a two-stage process is cumbersome and uneconomic. Further, at the high temperatures required to obtain products of high molecular weight by this process there is danger of cross-linking when the reagents include a disulphonyl halide. A further disadvantage is the loss of volatile reagents during the reaction at these high temperatures.

The presence of a diluent or solvent therefore leads generally for example to easier control of the polymerization reaction and allows easier addition of substances to the reaction mixture, such as, for example, monomers, reaction terminators. However, the presence of certain diluents or solvents in the polymer can lead to the polymer having inferior properties such as, for example, reduced melt stability or heat stability. We have now found that use of an inert high-melting solvent can facilitate removal for recovery of the diluent or solvent used in the polymerization reaction whilst maintaining the polymer in a form capable of conventional extraction.

According to the present invention a method is provided for improving the isolation of aromatic polysulphones from the reaction mixture in which they are formed, which comprises incorporating in the reaction mixture an inert high-melting solvent for the aromatic polysulphone, the inert high-melting solvent being liquid at the polymerization temperature but solid at the temperature at which the reaction mixture is subsequently processed, and allowing the mixture of polysulphone and inert high-melting solvent to cool and solidify.

The inert high-melting solvent may be any solvent which is inert at the temperature of the polymerization reaction or that at which the polymerization diluent or solvent is removed, and which is liquid at those temperatures but solid at temperatures at which the reaction mixture is processed further. It is preferably a dipolar aprotic solvent such as, for example, diphenyl sulphone, bis(4-chlorophenyl) sulphone, bis(4-methylphenyl) sulphone or 9,9-dioxodibenzothiophen. Diphenyl sulphone is a preferred inert solvent.

According to the method of the invention, the inert high-melting solvent is added to the polymerization reaction mixture and any more volatile solvent previously present is removed, by for example distillation under reduced pressure. Aromatic polysulphone may then be extracted from the resulting mixture, for example by crushing the solid mass formed on cooling, washing the crushed mass with hot methanol and water, and drying.

In one preferred embodiment of the invention, the inert high-melting solvent is present in the polymerization reaction mixture before the onset of polymerization, in which case it may itself be the sole polymerization solvent, provided that any previous solvent is completely removed before high polymerization temperatures are reached. This is conveniently the case, for example, where dimethyl sulphoxide has been used previously, for traces

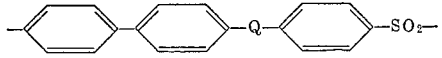

of this solvent adversely affect a nucleophilic polymerization reaction to give polysulphones at temperatures above 180° C. Certain of the solvent solids used according to the present invention, however, such as bis(4-chlorophenyl) sulphone, take part in nucleophilic polymerization reactions and accordingly are not within the scope of the invention as far as it applies to the use of the solvent solids as polymerization solvents for nucleophilic polymerization reactions but only to their use as isolation media, when they may be added to the polymerization mixture before or after some of the solvent for the polymerization reaction has been removed.

The cooled solid mixture of polysulphone and inert high-melting solvent produced according to the invention is conveniently processed further by crushing to a coarse powder and extracting the powder with a volatile solvent for the inert high-melting solvent. The latter may be recovered from these extracts and used again. The volatile solvent used for the extraction should be a non-solvent for the desired polysulphone. Lower alcohols such as methanol are convenient extraction solvents.

The invention is illustrated by the following examples.

EXAMPLE 1

Diphenyl ether (8.51 g.; 0.05 mole), diphenyl ether-4,4'-disulphonyl chloride (18.36 g.; 0.05 mole) and nitrobenzene (40 cm.³) were stirred together under a stream of dry nitrogen. The resulting solution was heated to 120° C. and then a solution in nitrobenzene (10 cm.³) of ferric chloride (0.0162 g.; 0.001 mole) was added. The solution was then stirred at 120° C. for 5 hours whilst hydrogen chloride evolved. The viscous solution was then heated to 160° C. and diphenyl sulphone (35 g.) was added. Nitrobenzene was distilled from the reaction mixture under pressure reducing to 10 torr to give a hot, viscous solution of poly(diphenylene ether sulphone) in diphenyl sulphone. The hot polymer solution was poured onto a metal tray whereupon it solidified. The brittle solid was crushed to a coarse powder which was extracted with hot methanol containing 1% v./v. acetyl acetone, hot methanol-acetone (60:40 v./v.) and finally hot methanol to yield polymer (22.4 g.) which had repeat units of the formula

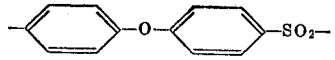

and had a reduced viscosity of 0.55, measured on a solution in dimethyl formamide at 25° C. of 1 g. polymer in 100 cm.³ of solution.

EXAMPLE 2

Diphenyl ether - 4 - sulphonyl chloride (26.88 g.; 0.100 mole) and diphenyl sulphone (60 g.) were melted together, with stirring, under a stream of dry nitrogen. The temperature of the melt was brought to 160° C. then ferric chloride (ca 10⁻² g.) was added. Hydrogen chloride evolved and the reaction mixture was stirred at 160° C. for 4 hours, poured onto a metal tray whilst still hot and allowed to cool to a brittle solid. The solid was crushed to a coarse powder which was extracted as described in Example 1 to yield polymer (22.3 g.) which had repeat units of the formula

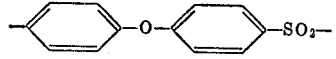

This example was repeated using a mixture of diphenyl ether - 4 - sulphonyl chloride (13.44 g.; 0.050 mole) and biphenyl - 4 - sulphonyl chloride (12.64 g.; 0.050 mole) in place of diphenyl ether - 4 - sulphonyl chloride alone. In this experiment, a copolymer was obtained containing equal amounts of diphenylene ether sulphone units (I) and of biphenylene sulphone units (II)

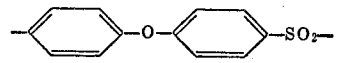

(I)

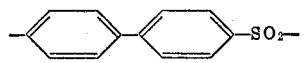

(II)

EXAMPLE 3

A sample (51.71 g.; 0.15 mole) of 4-(4-chlorophenylsulphonyl) - 4' - hydroxybiphenyl, aqueous potassium hydroxide solution (37.5 cm.³; 4 normal; 0.15 mole), bis(4-chlorophenyl) sulphone (0.258 g.; 0.9 millimole) and 1,1 - dioxothiolan(sulphonlane) (132.5 cm.³) were stirred and heated to 160° C. under a stream of nitrogen. Water and then some sulpholane (70 cm.³) were distilled from the reaction mixture under reduced pressure (20 torr) and then the reaction mixture was heated to 240° C. for 1 hour under a stream of nitrogen.

Diphenyl sulphone (128 g.) was added to the resulting viscous solution through which gaseous methyl chloride was then passed for 1 hour. The 1,1-dioxothiolan remaining in the polymer solution was removed by distillation under reduced pressure and the hot solution of polymer in diphenyl sulphone was poured onto a metal tray where it cooled to an almost white, brittle solid. The solid was crushed to a granular powder which was extracted with hot methanol and water and then dried to yield polymer having repeat units of the structure

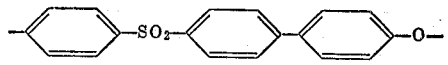

and had reduced viscosity 0.61 measured at 25° C. on a solution in dimethyl formamide containing 1 g. of polymer in 100 cm.³ of solution (1% w./v.).

EXAMPLE 4

The procedure of Example 3 was repeated using (a) bis-(4-methylphenyl) sulphone and (b) bis-(4-chlorophenyl) sulphone in place of diphenyl sulphone. In both cases a brittle solid solution of the polymer was obtained which was crushed to a granular powder and was extracted with methanol and water to yield the polymer.

EXAMPLE 5

A viscous solution in dimethyl sulphoxide of polymer having repeat units of the structure

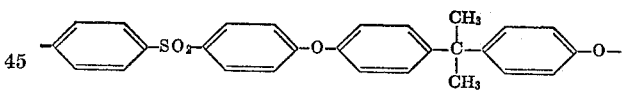

was prepared according to Example 1 of British specification 1,078,234. To this solution at 135° C. was added diphenyl sulphone (35 g.). Dimethyl sulphoxide was distilled from the resulting solution under reduced pressure whilst the temperature of the solution was raised to 185° C. The hot solution of polymer in diphenyl sulphone was then poured into a metal tray where it cooled to a brittle solid which was crushed to a granular powder. The free-flowing powder was extracted with hot methanol and then water to yield polymer.

EXAMPLE 6

A sample (51.67 g.; 0.15 mole) of 4-(4-chlorophenyl sulphonyl)-4'-hydroxybiphenyl, aqueous potassium hydroxide solution (37.5 cm.³; 4 normal, 0.15 mole), bis-(4-chlorophenyl) sulphone (0.172 g.; 0.6 millimole), dimethyl sulphoxide (80 cm.³) and diphenyl sulphone (66 g.) were stirred together under a stream of nitrogen and then heated to 150° C. Water distilled from the reaction mixture at atmospheric pressure and then dimethyl sulphoxide was removed under reduced pressure and the temperature of the semi-solid reaction mixture was then raised to 280° whilst polymerization commenced. After being stirred for 30 minutes at 280° C., the viscous solution was saturated with methyl chloride gas for one hour and then poured whilst still hot onto a metal tray. The solution cooled to a brittle solid which was crushed to a granular, free-flowing powder. The powder was extracted with hot methanol and water to yield polymer which had a reduced viscosity of 0.51, as measured on a 1% w./v. solution in dimethyl formamide at 25° C.

EXAMPLE 7

Potassium hydroxide (8 moles; 448 g.; as 50% solution in water) was charged to a stainless steel vessel (capacity 5 dm.$^3$) which was fitted with a stirrer, a reflux condenser and nitrogen purge. Dimethyl sulphoxide (2 dm.$^3$) and bis-(4-chlorophenyl) sulphone (1148.8 g.; 4 moles) were then added and the mixture heated with vigorous stirring at 135° C. for several hours to produce a solution in dimethyl sulphoxide of the potassium salt of 4-(4-chlorophenylsulphonyl)phenol. The reaction mixture was allowed to cool and the potassium chloride formed was allowed to settle. A portion (200 cm.$^3$) of supernatant liquor was transferred under nitrogen from the steel vessel to a glass flask (1 dm.$^3$ capacity) fitted with a stirrer and condensing equipment suitable for vacuum distillation. Diphenyl sulphone (120 g.) was added and the mixture was heated carefully under nitrogen at reduced pressure (about 15 torr) until all water and dimethyl sulphoxide had distilled out. The vacuum was released and the flask filled with nitrogen to atmospheric pressure and the residual liquid was heated to 260° C. for several hours. The viscous product was poured onto a metal tray and allowed to cool. The resulting brittle solid was crushed to a granular powder which was first extracted with hot methanol and then with water, and finally dried. The product had repeat units of the structure

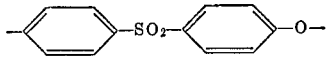

and a reduced viscosity of 0.35 as measured on a 1% w./v. solution in dimethyl formamide at 25° C.

We claim:

1. A method for improving the isolation of aromatic polysulphones from the reaction mixture in which they are formed in the presence of a solvent by a nucleophilic polymerization reaction, which comprises (1) incorporating a diphenyl sulphone as an inert high-melting solvent for the aromatic polysulphone into the polymerization reaction mixture in which a more volatile solvent is previously present, the inert high-melting solvent being liquid at the polymerization temperature but solid at the temperature at which the reaction mixture is subsequently processed, (2) removing the more volatile solvent by distillation, the amount of said high-melting solvent being sufficient to keep said polymer in the fluid condition after said volatile solvent is removed, (3) allowing the mixture of aromatic polysulphone and inert high-melting solvent to cool and solidify, and (4) extracting the high-melting solvent from the aromatic polysulphone in the resulting mixture by dissolving out said high-melting solvent with a solvent therefor which is a non-solvent for the polysulphone.

2. A method according to claim 1 in which the aromatic polysulphone has repeating units of the formula

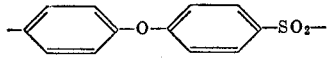

3. A method according to claim 1 in which the aromatic polysulphone has repeating units of the formula

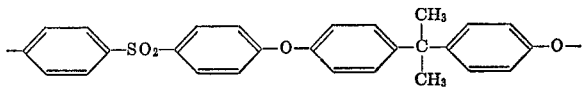

4. A method according to claim 1 in which the inert high-melting solvent is diphenyl sulphone.

5. A method according to claim 4 which comprises incorporating diphenyl sulphone into the reaction mixture before the onset of polymerization and removing the more volatile solvent before a high polymerization temperature is reached.

References Cited
UNITED STATES PATENTS

| | | | |
|---|---|---|---|
| 3,321,449 | 5/1967 | Vogel | 260—79.3 |
| 3,332,909 | 7/1967 | Farnham et al. | 260—47 |
| 3,431,230 | 3/1969 | Jackson, Jr. et al. | 260—33.8 |
| 3,634,355 | 1/1972 | Barr et al. | 260—49 |

LESTER L. LEE, Primary Examiner

U.S. Cl. X.R.

260—30.8 R, 79